Nov. 29, 1960
M. J. KOFOID
2,962,717
MICROWAVE APPARATUS HOUSING AND
METHOD OF CONSTRUCTING THE SAME
Filed May 13, 1957
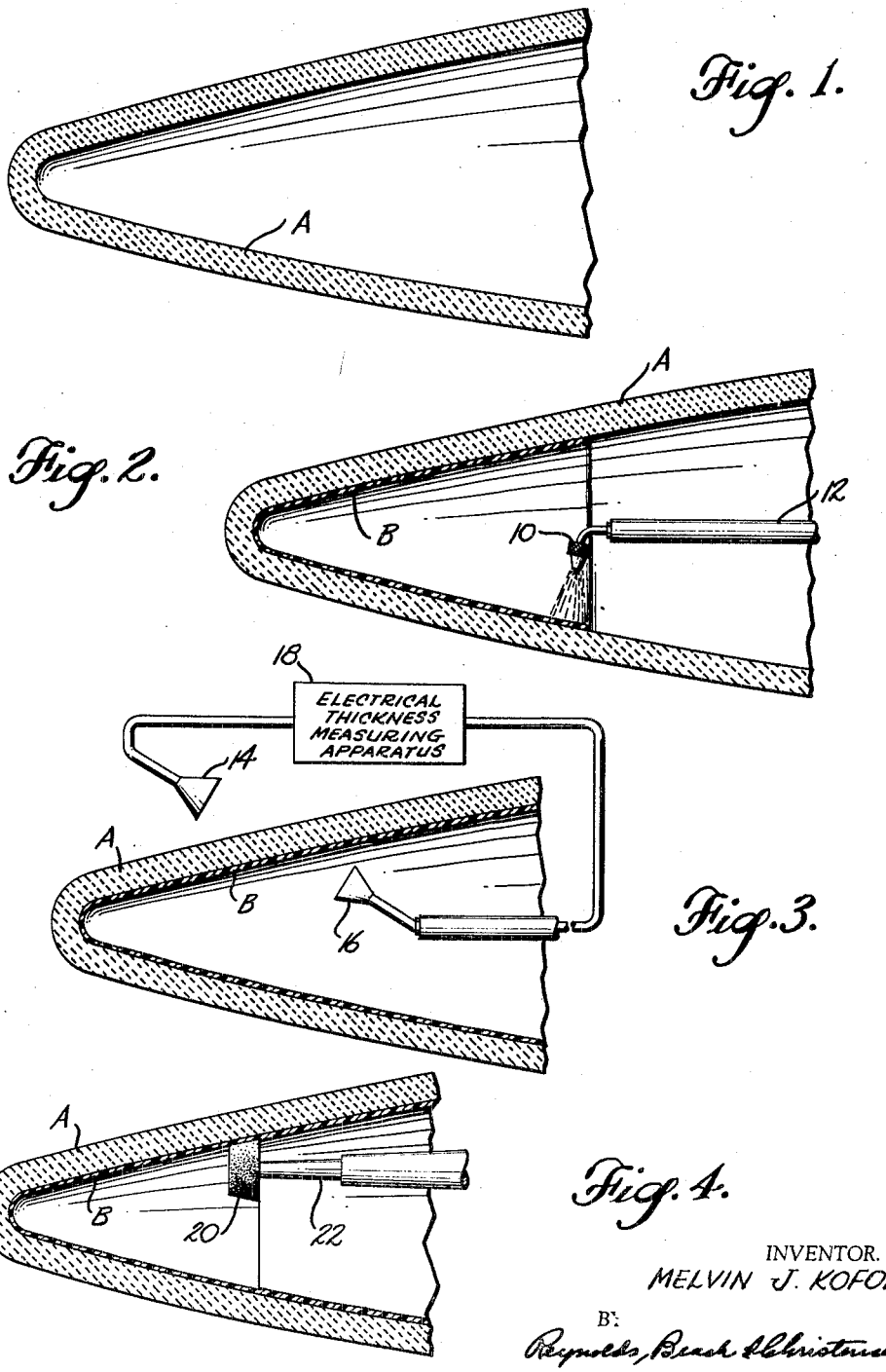
INVENTOR.
MELVIN J. KOFOID
BY
Reynolds, Beach & Christensen
ATTORNEYS

United States Patent Office 2,962,717
Patented Nov. 29, 1960

2,962,717

MICROWAVE APPARATUS HOUSING AND METHOD OF CONSTRUCTING THE SAME

Melvin J. Kofoid, Seattle, Wash., assignor to Boeing Airplane Company, Seattle, Wash., a corporation of Delaware Filed May 13, 1957, Ser. No. 658,839

8 Claims. (Cl. 343—872)

This invention relates to improvements in radomes and similar microwave apparatus housings, and is herein illustratively described by reference to the presently preferred form thereof as applied to the nose radome for a supersonic aircraft. However, it will be recognized that certain modifications and changes therein with respect to materials and details of procedure in the manufacture of the radome may be made without departing from the essential features of the invention, and that the applications of the invention may vary.

At the high temperatures developed in leading surfaces of supersonic aircraft conventional radome structural wall materials become plastic and weak, with consequent loss of aerodynamic form if not complete structural failure. Moreover the surface softens, and it is important that the exterior surface of the radome remain hard at all operating temperatures so as to resist the impact of rain and hail without pitting. Pitting, of course, increases the aerodynamic drag as well as decreases electrical efficiency. If the radome wall is to be designed for efficient energy transmission at microwave frequencies it will be made relatively thin (i.e., one-half electrical wavelength in thickness, or a small whole number multiple thereof) as it should be also for minimum weight. Consequently, an efficient radome of conventional structural materials for low speed aircraft is structurally inadequate at supersonic speeds.

Because of the above and related problems, consideration of late has been given to refractory type materials, the term "refractory" herein being used in the broadest sense to include ceramics, glass and other vitreous substances or their equivalent capable of withstanding relatively high temperatures without loss of strength and hardness. In fact, attempts have been made to manufacture radomes of these materials and successful ones have been created; however, they have been costly and have not been made on an efficient production basis. The problem chiefly arises because of the close tolerances required in the final electrical wall thickness of the finished radome. It is difficult in a hollow molded figure so large (some may be ten or more feet long and a few or more feet in diameter at the base) to achieve a precise physical wall thickness. It is even more difficult to achieve precise electrical wall thickness. This is true for the reason that slight inhomogeneity in the molded wall material can materially alter the dielectric constant thereof in different local areas or zones so as to create differences in electrical thickness even though physical thickness in these same areas is identical. Consequently, even with the closest of control in the molding process and with the most precisely made molding dies it is probable that thickness corrections will be required. As is well known these corrections are difficult to make because of the extreme hardness of the refractory materials of interest and therefore the high cost of machining them to the required specifications.

The present invention is broadly directed to the manufacture of a practical and efficient production radome or other microwave apparatus housing capable of withstanding high temperatures without appreciable loss of strength nor of the hardness of its exterior surface; more specifically it is an object to enable manufacturing the radome body of a refractory type material by a simple and rapid method, yet readily achieving the required electrical wall thickness to the necessary high degree of precision for ultra-high frequency microwave operation.

A specific object of the invention is an efficient and inexpensive method of manufacturing refractory type radomes suitable for supersonic aircraft microwave radar installations and similar applications.

Yet another object is an improved high temperature radome or the like deriving its hard and smooth exterior and its basic mechanical strength from a molded or otherwise formed refractory material but being readily correctable to the required electrical wall thickness by machining operations which do not disturb the aerodynamic form and smooth surface of its exterior nor impair its electrical efficiency.

Still another object is such a radome adapted for manufacture from readily available and electrically efficient materials by convenient methods.

In accordance with the improvements comprising this invention, the radome or housing wall is formed generally of two substantially homogeneous dissimilar layers adhered together. The outside layer is molded or otherwise formed to the required exterior form and smoothness from a hard, strong, homogeneous, temperature resistant refractory material to constitute the radome body having an electrical wall thickness preferably slightly less than the required value. To the inside face of this body form is applied a more or less uniform, relatively soft and readily machinable or otherwise removable layer of dielectric material having approximately the same dielectric constant as the refractory material. The combined thickness of the two layers initially slightly or appreciably exceeds the specified electrical wall thickness for the radome. Electrical thickness in different areas of the radome thus initially fabricated is then measured, whereupon material is removed, such as by a machining process, only from the inside layer in the designated areas of excess electrical wall thickness in order to achieve the required electrical thickness through the wall areas traversed by microwave energy. Preferably the inside layer comprises a binder substance and a filler material with or without additional materials for imparting the required dielectric constant and any other desired physical properties to such inside layer as will hereinafter more fully appear.

While the inside layer becomes heated and relatively weak at supersonic speeds it is not required to possess hardness nor strength because of its sheltered and supported position adhered to the outside layer, but only to adhere and to retain sufficient body and stiffness to avoid slumping or flow under the forces of acceleration encountered. A number of relatively high temperature thermoplastic resins as well as other substances are capable of serving as inside layer materials or as binders for achieving that result even though they may be unsuitable and inadequate for structural purposes or exterior finishing in such a radome wall. Fillers and dielectric constant modifiers may or may not be necessary depending upon the binder used and upon the dielectric property of the body layer material selected in a particular case.

These and other features, objects and advantages of the invention will become more fully evident from the following description thereof by reference to the accompanying drawings.

Figure 1 is a fragmentary longitudinal sectional view of the outside or body layer of a typical supersonic aircraft nose radome being made in accordance with this invention.

Figure 2 is a view similar to Figure 1 in which the relatively thin and readily machinable or removable inside layer is being applied to the inside face of the refractory outside layer by a spraying process in this example.

Figure 3 is a view similar to Figure 2 in which the initially completed multilayer radome wall is being measured for electrical wall thickness deviations in different specific areas of the wall to be traversed by microwave energy.

Figure 4 is a similar view illustrating application of a grinding tool to the inside layer for removing excess material in order to achieve the required electrical wall thickness in accordance with measurements made heretofore.

In the illustrated application the microwave housing or radome is of elongated ogival form adapted for mounting on the nose of the guided missile or other supersonic aircraft. It may or may not have a needle or prong at its tip. None is shown. If one is used it will be of refractory material in the usual case, although it could be of metal since it is virtually opaque to energy propagation in any case. Such a radome, depending upon the particular aircraft, may vary from a few feet to ten or more feet in length and from a base diameter of one foot or less to several feet. In Figure 1 outside or body layer A has been formed. This layer or shell is fabricated of refractory material as stated above by any suitable method, the preferred being a molding process using male and female dies. Its exterior surface is a polished or smooth surface for aerodynamic reasons, and its finish may be imparted by the smoothness of the female mandrel or die, or if desired by subsequent polishing. Its thickness is made preferably slightly less than the required electrical wall thickness of the radome at the operating frequency of the microwave apparatus. For maximum efficiency of energy transmission through the radome wall, electrical thickness is normally made one-half wavelength of the energy propagating in the wall material. In the case of K-band operation or higher frequencies it may be necessary for mechanical strength to use walls which are a whole number multiple of a half wavelength in thickness. In any case, the refractory outside layer A itself should be of slightly less than the specified electrical thickness for the completed wall and in no area traversed by energy may it exceed that value. If desired, it may be made materially less than that amount although for maximum strength of the radome wall at the high operating temperatures encountered it is desired to have as much of the wall body made up of the substantially homogeneous refractory material as possible.

For example, if the material of outside layer A is a high grade of porcelain, such as that commonly used in spark plug insulators, having a dielectric constant of approximately 5.5 the layer A for an X-band radar will preferably have a thickness slightly less than about 0.26 inch, which is 0.02 inch less than the required 0.28 inch for half-wave electrical thickness at X-band operation. The remaining 0.02 inch required for half-wave electrical thickness is made up by the correctively machined inside layer to be applied.

Of course, if the entire radome wall were to consist solely of the layer A machined to the required degree of precision, then it would be necessary initially to make the layer A of a thickness which more or less exceeded the ultimate thickness required and to machine off the excess in areas proving to be too thick in terms of electrical thickness. That is the practice in making experimental nonproduction radomes mentioned above. However, in the second step of the present method, an inside layer B of relatively machinable or otherwise removable dielectric material is adhered to the inside surface of the layer A with an initial thickness such that combined electrical thickness of the two layers is certain at least slightly to exceed the ultimate required electrical thickness. In Figure 2 the inside layer B is being applied by a spraying device 10 supplied through a conduit 12 from a suitable source (not shown) of material in liquid form or suspended in a liquid binder. Well known methods of control may be applied to the spraying operation or other process for applying the inside layer in order to build up the required thickness of that layer. The thickness of this inside layer as initially applied is not critical if it exceeds a predetermined minimum.

After the inside layer has solidified and hardened, the composite thickness of the radome wall is carefully measured in all areas to be traversed by the microwave energy in order to determine the amount of inside layer material to be removed, if any, in different areas. In Figure 3 the step of measuring electrical wall thickness is depicted, involving use of microwave energy transmitting and receiving horns 14 and 16 disposed on opposite sides of the wall and connected to suitable electrical thickness measurement apparatus 18 usually in the nature of a calibrated variable phase comparison device. An example of such apparatus is disclosed in my copending patent application Serial No. 604,673, filed August 17, 1956, Radome Electric Wall Thickness Measurement and Correction. The electrical thickness measurement procedure and equipment may vary.

The grinding or other machining or material-removing process by which inside layer material is removed for correcting the wall thickness to the required value may be carried out in conjunction with the measurement process or as an entirely subsequent operation. In Figure 4 a grinding tool 20 on a spindle 22 is shown being applied to an area of the inside layer of the composite radome in order to remove excess thickness thereof, as shown or determined to be necessary from the previous measurements. Control of the machining tool may be automatic or may be manual. Automatic control may be achieved in accordance with the teachings of Albert J. Whitehill in Serial No. 612,012, filed September 25, 1956, entitled Apparatus for Grinding Radome Walls to Controlled Electrical Thickness, and assigned to the same assignee.

The grinding process is preferably carried out in a manner insuring against removal of too much material so as to avoid requirement of a subsequent spraying of additional material on the inside layer surface before the radome is completed. Thus the various areas requiring removal of inside layer material may be ground lightly, the radome again measured for electrical thickness, then reground as necessary one or more times in order to achieve the desired end result.

While the invention is not limited to any specific material for the refractory substance making up the outside layer nor for the readily removable dielectric substance adhered to the inside surface thereof, certain considerations govern the choice of materials. There are a number of different materials for each layer which may be used successfully and as time goes on material superior to those already known may well be discovered.

One suitable refractory material for the outside layer comprises a well known ceramic substance which consists of a mixture of powdered alumina ($Al_2O_3$) and additive providing for workability of the material in the green state. In a preferred high alumina mixture in which the alumina exceeds ninety percent and typically will be about ninety-six percent total by weight, the additives consist of a clay, a talc, bentonite and certain fluxes such as iron oxides. Such a material is manufactured, for example, by Coors Porcelain Company, of Golden, Colorado, under the designation "AI–200." Still another suitable outside layer material is glass suitably tempered for strength.

Still another suitable type of material is any of the so-called "pyrocerams" such as type "607 BUZ" manufactured by the Corning Glass Company. Such materials exhibit the characteristics of glass when being formed and may be converted by heat to a ceramic type substance.

If glass is used and greater resilience is required than the normal amount for glass, mica may be added, although this tends to lower the upper temperature limit capable of being withstood.

Dielectric constant of the body layer may be increased by the known technique of adding conductive metal powder or flakes, and this will not materially increase the electrical losses.

All of these and other refractory type materials which may be used for the outside layer, i.e., which have a relatively low dielectric loss factor, a reasonably high dielectric constant permitting a half-wave wall to be relatively thin and light in weight though strong, and possess the required degree of surface hardness and mechanical strength at high temperature, are hard and difficult to machine.

A suitable substance useful for the inside layer B, indeed the presently preferred substance, comprises a slurry of hydrolyzed ethyl silicate as a binder, with powdered alumina added to impart body to the layer for minimizing shrinkage. When the layer is heated to two or three hundred degrees to drive off the water and ethyl alcohol a hard but readily machinable residue will remain having a dielectric constant which approximately equals that of a high-alumina outside layer. It is important in the case of a relatively thick inside layer that the dielectric constant thereof be fairly close to that of the outside layer whereas it may depart increasingly therefrom as the inside layer is made relatively thinner, without impairing the ability of the wall to transmit microwave energy without reflection. If desired, amounts of powdered titania ($TiO_2$) may be added to the slurry in order to increase the dielectric constant whereas mica may be incorporated if it is desired to provide a film which is relatively tough and durable. Ordinarily mica will not be necessary, whereas the need for titania will depend upon the dielectric constant of the outside body layer material. If desired, finely ground silica may be substituted as the filler or as a means to modify the dielectric constant of the inside layer. Conductive metal flakes or powders may be added if desired to increase the apparent dielectric constant of the inside layer. These and other variations will be obvious to those familiar with ceramics and dielectric materials. The object is to provide a substantially homogeneous readily machinable inside layer which, for convenience, may be applied in a liquid vehicle or as a liquid solution, in a relatively thin coating adapted to adhere well to the inside face of the outer layer and to solidify into a low-loss dielectric having a dielectric constant close to that of the outside layer.

Still another class of materials that may be used for the inside layer are some of the high-temperature resins such as polyester, silicone, phenolic or epoxy resins. If desired these may be used alone. Alternatively they may be used as binders supplemented by filler materials or other additives to alter their properties, as aforementioned. Such resinous materials may be used successfully to temperatures as high as of the order of one thousand degrees Fahrenheit or higher and while they may tend to soften at these temperatures this is not a serious defect inasmuch as they still possess sufficient body and strength to remain adhered to the outside layer and to avoid slumping or flowing out of position so as to alter the inside layer thickness.

In selecting the substance for the inside layer, particularly the binder substance, care should be exercised to avoid any substance which holds water. The presence of water in the composite layer greatly increases the dielectric losses for high frequency energy propagating through the wall and tends to increase the reflectivity of the wall. Thus, such substances as waterglass or sodium silicate are undesirable even though they may be suitable binders for other applications. If desired, the inside layer may be treated with a sealer such as a silicone to prevent moisture absorption.

Any of the inside layer materials described above are sufficiently soft at ordinary temperatures to be readily removable by a grinding or similar machining process in order to achieve the desired thickness. Such grinding of the inside layer need not be a polishing operation nor leave the surface particularly smooth and regular, since minor ridges and hollows or other localized irregularities do not materially affect the passage of a relatively wide beam of energy provided the average thickness is an electri-half wavelength (or whole number multiple thereof).

If desired the inside face of the outside body layer may be roughened before the inside layer material is applied thereto, in order to improve the adherence of the inside layer.

As previously mentioned not only is it desirable to make the outside layer as thick as possible so that it will possess maximum strength at high temperature but it is also desirable to make the inside layer as thin as possible so that its dielectric constant need not be as closely matched to that of the outer layer as otherwise. Even so, a dielectric constant equal to that of the outside layer is optimum from the electrical standpoint (i.e., minimum reflection due to dielectric discontinuity at the interface). However, from the standpoint of machining tolerances, a lower dielectric constant for the inside layer is desirable. For example, if the inside layer has a dielectric constant only about half as large as that of the main body material then the physical tolerance to satisfy a given electrical thickness tolerance would be $\sqrt{2}$ times greater than in the case of an inside layer having a dielectric constant equal that of the outer layer. These and related considerations described above govern the design of the improved radome wall.

I claim as my invention:

1. A housing for microwave apparatus adapted to operate at a predetermined wavelength, said housing having a composite wall adapted for traversal by microwave energy and comprising a hard, dense, substantially homogeneous outside layer of dielectric refractory material and a relatively soft and readily machinable substantially homogeneous dielectric inwardly facing layer on the inside face of the wall, the combined electrical thickness of the wall layers constituting substantially a small whole number of half wavelengths effectively throughout the entire area thereof adapted to be traversed by microwave energy propagating transversely therethrough.

2. The housing defined in claim 1, wherein the housing wall consists of said outside and inside layers adhered directly to each other.

3. The housing defined in claim 2, wherein the physical thickness of the inside layer is a small fraction of that of the outside layer and wherein the layers have at least approximately equal dielectric constants.

4. A radome consisting substantially of a relatively thick refractory dielectric outside layer and a relatively thin inwardly facing layer adhered to the inside face of said refractory layer, said relatively thin layer comprising a dielectric material which is relatively machinable and which has a dielectric constant substantially equal to that of said outside layer.

5. A temperature resistant radome for high-speed aircraft comprising a substantially solid and homogeneous refractory dielectric wall having an electrical thickness less than a whole number of half wavelengths, and an inwardly facing compensating layer of machinable dielectric material adhered to the inside face of said refractory wall and having an electrical thickness in the different areas thereof which when added to that of said wall produces a total which substantially equals a whole number of half wavelengths, said compensating layer having a thickness which is materially less than said wall and having a dielectric constant of the same order of magnitude as that of said wall.

6. The method of manufacturing a temperature resistant housing of predetermined electrical wall thickness for microwave apparatus, comprising the steps of molding the housing wall of refractory material to an electrical thickness slightly less than said predetermined thickness, adhering a dielectric coating to the inside face of said wall of an electrical thickness which when added to that of said wall initially produces a total which substantially exceeds said predetermined electrical thickness and over an area which includes the area thereof to be traversed by microwave energy, said coating comprising material which may be removed to varying depths readily by comparison with removability of the refractory wall material, and removing at least some of the thickness of the coating material in such areas and by such amounts as will produce an effective composite electrical wall thickness substantially equal to said predetermined thickness in areas to be traversed by microwave energy.

7. The method of manufacturing a temperature resistant housing of predetermined electrical wall thickness for microwave apparatus, comprising the steps of molding the housing wall of hard heat resistant dielectric material to an electrical thickness slightly less than said predetermined thickness, adhering a dielectric coating to the inside face of said wall of an electrical thickness which when added to that of said wall initially produces a total which substantially exceeds said predetermined electrical thickness and over an area which includes the area thereof to be traversed by microwave energy, said coating comprising material which may be removed to varying depths readily by comparison with removability of the wall material but which has a dielectric constant at least approximately equal to that of the first-mentioned material, and removing at least some of the thickness of the coating material in such areas and by such amounts as will produce an effective composite electrical wall thickness substantially equal to said predetermined thickness in areas to be traversed by microwave energy.

8. A high-speed aircraft radome wall construction comprising a relatively thick, hard, dense, substantially homogeneous outside layer of dielectric refractory material having a smooth exterior surface, and an inwardly facing relatively readily removable and thin substantially homogeneous layer adhered to the inside of the wall and having an exposed surface contoured in such manner that the combined electrical thickness of the wall layers constitute substantially a small whole number of half wavelengths effectively throughout the entire area thereof adapted to be traversed by microwave energy propagating transversely therethrough, the dielectric constant of the two layers being at least approximately equal.

References Cited in the file of this patent

UNITED STATES PATENTS

| | | |
|---|---|---|
| 2,494,368 | Steele | Jan. 10, 1950 |
| 2,617,934 | McMillan et al. | Nov. 11, 1952 |
| 2,755,216 | Lemons | July 17, 1956 |

OTHER REFERENCES

"Grits and Grinds," vol. 34, No. 9, pages 6 and 7, and 9.